Oct. 22, 1963     J. H. CASLOW     3,107,688
SURGE DAMPING VALVE
Filed Oct. 5, 1961
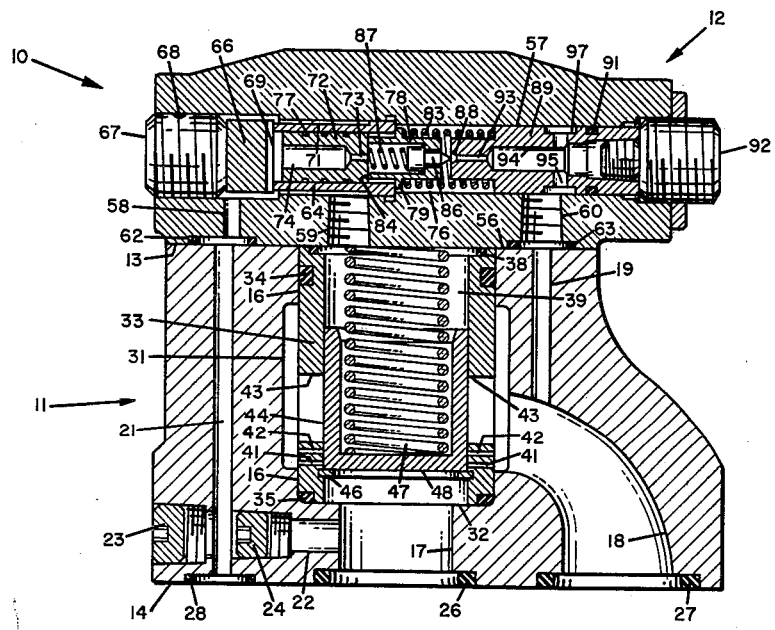
INVENTOR.
JOSEPH H. CASLOW
BY
WOOD, HERRON & EVANS

United States Patent Office 3,107,688
Patented Oct. 22, 1963

3,107,688
SURGE DAMPING VALVE
Joseph H. Caslow, Columbus, Ohio, assignor to American Brake Shoe Company, New York, N.Y., a corporation of Delaware
Filed Oct. 5, 1961, Ser. No. 143,173
10 Claims. (Cl. 137—494)

This invention relates to a valve for damping or eliminating sudden pressure surges in a hydraulic line or system.

Pressure surges are caused by abrupt changes in the momentum of hydraulic fluid under pressure in a hydraulic system. For example, when fluid at high pressure from a pump is suddenly or abruptly applied to a fluid motor which is at rest, the rate of flow of the fluid drops very quickly until the physical inertia of the motor can be overcome and the fluid can set the motor in motion. As this abrupt stoppage of flow occurs, the kinetic energy of the moving fluid is converted very rapidly to pressure energy, which manifests itself as a pressure surge. The common phenomenon of water hammer is an illustration of such a pressure surge. While they are usually of short duration, these surges are practically unavoidable and can cause severe damage to a hydraulic system, and it is the common practice to introduce various surge damping means into hydraulic systems for protection against damage from surges.

The present valve is adapted to be connected in a hydraulic fluid conduit to permit free flow therein in a given direction at constant or gradually changing pressures, and ordinarily imposes no important restriction on the flow of fluid. However, if for any reason the pressure at the inlet side of the valve sharply or abruptly surges, the valve absorbs the shock itself, and thereby insulates or protects the rest of the system from the surge, permitting the pressure and flow at its outlet to rise only gradually. The valve is further characterized in that the force with which it opposes a surge increases with the magnitude of the surge, whereby the valve opens more slowly in response to a very large or rapid surge than it does in response to a more gradual, less abrupt pressure change, so that the hydraulic system is protected from the pressure change in direct relation to the severity of the change. Moreover, after the surge ends and pressure conditions at the inlet side of the valve begin to change more gradually, the valve responds more rapidly to the pressure change, so that the pressure across the valve will quickly equalize after the surge has passed.

In protecting a hydraulic system from a surge, the surge damping valve must itself absorb the full force of the surge. Obviously, the valve should be of a construction which will enable it to repeatedly withstand the force of the surges which it must absorb. One of the most important features of the present valve in contrast to past constructions is that it has been found in actual tests to be able to repeatedly withstand the force of surges without damage to itself, while protecting the circuit from those surges. In this regard the present structure is an improvement over the valve disclosed in Cecil E. Adams U.S. Patent No. 2,690,762 entitled "Hydraulic Shock Eliminator" which issued October 5, 1954.

In the preferred embodiment, the present valve comprises a body having a bore, an inlet entering the bore at its lower end and an outlet extending laterally from the bore. A sleeve is fitted into the bore and is provided with a series of axially spaced ports extending through it by which fluid can flow from the inlet to the outlet. The ports which are closest to the inlet are small and permit only limited or restricted flow to the outlet, while the ports which are farther from the inlet are large enough to permit full flow to the outlet. A cylindrical piston is fitted into the sleeve and is biased toward the inlet to close the ports in the sleeve. A fluid retaining chamber is defined above the piston, the pressure of fluid in which urges the piston toward the inlet while pressure at the inlet tends to lift the piston whereby the ports will be successively opened.

The rate of release of fluid from the chamber above the piston, which rate controls the rate at which the piston may move toward open position in response to a pressure change at the inlet, is determined by mechanism preferably contained in a cap structure which is mounted atop the valve body and which presents a fluid passage communicating between the fluid retaining chamber and the outlet. This mechanism includes means forming a seat in the passage and a needle valve element which is biased away from the seat. The needle is resiliently mounted in a needle retainer which is movable in the passage toward and away from the seat and which is biased away from the seat. A pressure differentially operated piston having a restricted orifice through it pushes the retainer and needle into closing relation with the seat in response to a pressure surge at the inlet, so that fluid in the chamber above the piston is released only slowly through the needle valve, thereby permitting the main piston to rise only at a slow rate and to open the ports slowly to admit flow to the outlet.

The invention may best be further explained in relation to the accompanying drawing, which is a vertical cross-sectional view through a preferred form of a surge damping valve embodying the principles of the invention, and in which the valve is shown in its closed position.

In the drawing a preferred valve in accordance with the present invention is designated generally by the numeral 10. The valve 10 comprises a main body which is designated by 11 and a cap structure or body 12 which is mounted on top of the main body 11. The body 11 contains the main valve elements which protect or insulate the outlet side of the valve from pressure surges at the inlet side, while the cap 12 includes structure which controls the response of the main valve elements to an increase of pressure at the inlet in accordance with the suddenness of that pressure change.

The specific valve body 11 which is illustrated in the drawing is adapted for subplate mounting to hydraulic apparatus and has a ¾" capacity, for use with ¾" inside diameter fluid conduits. It is capable of handling pressures up to 5000 p.s.i. It will be understood, however, that the pressure capability, flow capacity, and type of mount of the body are not critical or limiting insofar as the present invention is concerned, and that bodies of different sizes and capacities and for different types of mounts are encompassed by the invention. For example, any of the valve bodies shown in the copending application of Joseph A. Caslow and Robert Smilges, Serial No. 102,824, filed April 13, 1961, and entitled "High Speed Valves," may be substituted for the valve body 11 shown.

The body 11 has a flat upper surface or face 13 to which the cap structure 12 is mounted, as will later be described in more detail, and has a flat lower surface 14 which is adapted to be fitted to a conventional subplate mount provided on hydraulic equipment or piping not shown. An internal chamber in the form of a cylindrical bore 16 is formed in body 11 extending downwardly from the upper surface 13 toward the lower surface 14. An inlet 17 which is coaxial with bore 16 but of smaller diameter extends from bore 16 to lower surface 14 of the body. An outlet 18 curves downwardly from the lateral surface of bore 16 to the lower surface 14 of the body at a position spaced from inlet 17.

In use, it is contemplated that inlet 17 will be connected to a source of fluid pressure such as a hydraulic pump or a hydraulic system including an accumulator, and that outlet 18 will be connected to a hydraulic circuit or to apparatus such as a fluid motor which is to be protected against pressure surges.

A vertical bore 19 connects outlet 18 to the upper surface 13 of body 11. Another vertical bore 21 extends from lower face 14 to the upper face 13 of the body, and is closed at its lower end by a subplate not shown. A transverse bore 22 extends from the exterior of body 11 to inlet 17 and intersects vertical bore 21. This transverse bore 22 is plugged on either side of vertical bore 21 by plugs 23 and 24. Fluid seals such as O-rings 26, 27, and 28 are provided where inlet 17, outlet 18, and vertical bore 21 respectively meet the lower face 14 of body 11, to seal the valve to its mount.

A cylindrical groove 31 is formed around bore 16 and communicates with outlet 18. The lower side of groove 31 is spaced slightly above the lower end 32 of bore 16. A hollow cylindrical sleeve 33 is closely fitted inside bore 16 and is provided with O-rings 34 and 35 around its external periphery adjacent its upper and lower ends respectively to seal it to the bore 16. At its lower end sleeve 33 is seated against the end 32 of bore 16, and the upper end of the sleeve is proximate to the upper surface 13 of the body 11. An O-ring 38 seals the upper end of sleeve 33 to the cap 12, a fluid retaining chamber 39 thus being defined within sleeve 33. Three rows of ports 41, 42, and 43 extend through sleeve 33 at axially spaced positions and communicate with groove 31 in bore 16. The ports comprising the lower two rows of ports 41 and 42 are quite small in diameter, for example about 0.031″ and 0.063″ respectively, so that only a small volume of fluid can pass through them, whereas the ports of the upper row 43 are large in diameter.

A hollow cup-shaped cylindrical piston 44 is slidably fitted within sleeve 33 and is urged downwardly therein by a spring 47 toward a snap ring 46 mounted in a groove on the inside of sleeve 33. At one end spring 47 bears against the lower end 48 of piston 44, and its upper end abuts the underside of the cap structure 12. By way of example but not limitation, spring 47 may have a rate of 19 lbs./inch and exert a force of 17 lbs. when the piston is in the closed position shown, and a force of 28 lbs. when the piston is in full open position. Snap ring 46 is positioned slightly below the lowermost row of ports 41, and under normal conditions, as illustrated, piston 44 closes all of the rows of ports 41, 42, and 43. Thus piston 44 forms a valve with the various rows of ports, sequentially opening the rows of ports as it moves upwardly in sleeve 33. It will also be seen that pressure in inlet 17 acts on the lower end 48 of piston 44 and tends to move the piston upwardly in sleeve 33 against the downward force of spring 47.

Cap 12 has a flat lower face 56 which is mounted against the upper face 13 of body 11 by screws not shown, and closes the upper end of chamber 39. A stepped horizontal or cross bore 57 extends through the cap, and vertical bores 58, 59, and 60 communicate between cross bore 57 and vertical bore 21 of body 11, chamber 39 in sleeve 33, and vertical bore 19 respectively. Appropriate fluid seals such as O-rings 62 and 63 are provided around bores 58 and 60 respectively at the lower face 56 of the cap to seal the connections between the various bores in the cap and body.

Inside cross bore 57 of the cap a hollow cylindrical sleeve 64 is closely fitted and is held against a shoulder in the bore by a spacer 66 which bears against it and by plug 67 which in turn bears against spacer 66. Plug 67 preferably includes a plastic thread interlocking insert 68, and seals the left end of bore 57. The end of spacer 66 which bears against sleeve 64 is transversely slotted, as at 69, to provide a fluid flow path around the end of the sleeve 64. A circumferential groove 71 is formed around the outside of sleeve 64 which groove communicates with vertical bore 59, whereby fluid may flow from bore 59 to the left end of sleeve 64 and through slot 69 in spacer 66 into the interior of the sleeve. A hollow cup-shaped piston 72 is slidably received within sleeve 64. This piston 72 is provided with a restricted orifice 73 which extends through its closed right end so that limited fluid communication is established between chamber 74 on the interior of the piston 72 and chamber 76 in cross bore 57 to the right of the piston. The diameter of orifice 73 may be 0.0350″. A series of circumferential grooves 77 around the outside of piston 72 form sliding fluid seals with the inside wall of sleeve 64.

Adjacent the closed end of piston 72 in cross bore 57 is a movable cup-shaped element or needle retainer 78 which has an abutment or stop 79 formed on its outside surface. The left end of retainer 78 is received loosely in sleeve 64, and the chamber on the inside of the retainer communicates with chamber 74 inside piston 72 through the restricted orifice 73. A helical coil spring 83 urges retainer 78 toward sleeve 64 so that stop 79 normally abuts the fixed stop defined by the right end of the sleeve. Spring 83 may for example have a rate of 24 lbs./inch and exert a force of 11 lbs. in the position shown in the drawing and a force of 13 lbs. when under maximum compression. Slots 84 are formed in the left end of retainer 78, and the retainer is somewhat smaller in diameter than the interior diameter of sleeve 64, so that fluid can flow from orifice 73 around the outside of retainer 78 into chamber 76. The retainer contains movable valve means in the form of a needle 86 which projects outwardly through a bore in the closed end of the retainer. Needle 86 has an enlarged head which is urged against the inside end of retainer 78 by a coil spring 87. The other end of spring 87 bears against the end of piston 72. Spring 87, which thus urges the needle 86 and retainer 78 to the right, is weaker than spring 83, which urges retainer 78 and piston 72 to the left, so that spring 83 normally holds stop 79 of retainer 78 against the end of sleeve 64 and spring 87 normally holds needle 86 outwardly from retainer 78 in the position shown. Spring 87 may for example have a rate of 1½ lbs./inch and exert a force of ¼ lb. in the position shown in the drawing.

Needle 86 cooperates with a seat 88 presented by a seat member or valve element 89 which is fitted in the right end of cross bore 57. Seat member 89 is sealed to bore 57 by an O-ring 91 and may be positioned axially therein relative to needle 86 by means of an adjusting screw 92. Seat 88 is conically tapered and forms a valve with needle 86 for controlling the release of fluid from chamber 39 in body 11, and communicates through a small diameter bore 93 (e.g. 0.0465″) to an enlarged bore 94 and a transverse bore 95. A circumferential groove 97 is formed around the outside of seat member 89 and communicates between transverse bore 95 and vertical bore 60 of the cap. The right end of spring 83 bears against a shoulder formed on seat member 89, and the spring normally holds needle retainer 78 and needle 86 therein away from seat 88, whereby limited fluid flow is normally permitted through valve 86, 88.

When no pressure is applied at inlet 17, or, more generally, if the pressure at the inlet is equal to or less than the pressure at outlet 18, piston 44 is held in the position shown by spring 47, and the several rows of ports 41, 42, and 43 in sleeve 33 are closed and no fluid can flow through the valve from the inlet to the outlet. Under conditions of equal pressure at the inlet and outlet, piston 44 is in substantial hydraulic balance, the pressure of fluid in chamber 39 which acts in the downwardly direction on the piston reflecting the pressure at the outlet with which it is in fluid communication as previously explained, which is equal to the upwardly acting pressure at inlet 17, so that the relatively low force of spring 47 holds the piston in closed position. If the pressure at the outlet is higher than the pressure at the inlet, a positive downwardly acting fluid force holds the piston in closed position.

If a gradually increasing pressure is applied to the lower end 48 of piston 44, this pressure will exert a larger upward force on the piston which will overcome the downwardly acting forces on the piston, and the piston 44 will start to move upwardly in sleeve 33. The rate at which the piston can move upwardly, and therefore the rate at which fluid may be admitted to outlet 18 through ports 41, 42, and 43, is determined by the rate at which the fluid under pressure in chamber 39 can be released from that chamber; in other words, piston 44 can move upwardly only as quickly as it can displace fluid from chamber 39. Fluid is released from chamber 39 up through vertical bore 59 in the cap, through the various passages and valve 86, 88 to vertical bore 60 in the cap and then to vertical bore 19 and outlet 18 of the body. Specifically, the fluid which is displaced from chamber 39 moves upwardly through vertical bore 59 to cross bore 57, then to the left in groove 71 around sleeve 64, through slot 69 in spacer 66 into chamber 74 within piston 72, and through restricted orifice 73. Because of the small size of orifice 73, only a small flow of fluid can pass through it at given pressure conditions. From this orifice the fluid flows into chamber 76 in cross bore 57 through slots 84 at the left end of needle retainer 78, around the outside of the retainer and through valve 86, 88, then through restricted aperture 98 to bores 94 and 95, groove 97, and bores 60 and 19 to outlet 18. Flow through restricted orifice 73 establishes a pressure drop and creates a hydraulic pressure differential between the left and right sides of piston 72 which tends to urge the piston to the right. However, spring 83 exerts a force to the left on needle retainer 78, spring 87 in which in turn urges piston 72 to the left in opposition to the force to the right established by the pressure differential across orifice 73. If the pressure rise at the inlet is gradual, as has been assumed for present purposes of illustration, then piston 44 is moved upwardly at a slow rate and fluid is displaced from chamber 39 through orifice 73 at a slow rate. Under these conditions the pressure drop across orifice 73 will not be large and the force of spring 83 will maintain the piston 72 and needle retainer 78 in the position shown, so that the valve 86, 88 remains open.

As the piston 44 rises in sleeve 33, it first uncovers or opens the lowermost row of ports 41 through sleeve 33. Because of the small size of these ports, only a small flow of fluid can pass through them to outlet 18, so that the pressure in the outlet will rise relatively slowly, and will not shock or damage a hydraulic circuit connected to the outlet side of the valve. As the piston moves further upwardly in sleeve 33 in response to pressure at the inlet, the next row of ports 42 are opened which also will permit only a small flow of fluid to the outlet. Finally the piston uncovers the large ports 43, by which time the pressure at the outlet has become approximately equal to the inlet pressure, and a large volume of fluid is permitted to flow through the valve. Upward movement of the piston will stop when the pressure drop between the inlet and outlet, multiplied by the area of the piston, equals the downwardly acting force of spring 47. Since the area of the piston is relatively large, the pressure drop across the piston when the valve is open will be small and fluid can flow through the valve without important loss of pressure.

If when the valve is closed the pressure in the inlet surges to a high value, a large force acts on the piston 44 tending to move it upwardly very quickly. However, the maximum rate of upward travel of the piston in sleeve 33 is governed by the rate at which fluid can escape from chamber 39, which rate of escape under these circumstances is sharply limited by the valve 86, 88 in the cap structure. As the piston 44 starts to move rapidly, the pressure in chamber 74 inside piston 72 also rises very rapidly, reflecting the rising pressure in chamber 39. The rapid flow of fluid through restricted orifice 73 in response to the high pressure in chamber 74 establishes a large pressure differential across the orifice, whereby the piston 72 is forced to the right overcoming the force of spring 83. As piston 72 moves to the right, it abuts the left end of retainer 78 and forces the retainer to the right with it. Spring 87 inside retainer 78 holds the needle 86 outwardly of the retainer, and as the piston and retainer move to the right, needle 86 is quickly brought into closing relation with seat 88, thereby preventing the further release of fluid from chamber 39 and preventing the further upward travel of piston 44. Although the motion of piston 72 and retainer 78 to the right may be very rapid, needle 86 cannot be damaged as it is moved into closing relation with its seat 88 because it is resiliently cushioned by spring 87. In this way no matter how rapid the surge of pressure at the inlet, or how great the force with which the piston is moved to the right, the needle valve cannot be injured, even though retainer 78 may hit seat member 89. Various past surge damping valve constructions, including the valve of previously mentioned Adams Patent No. 2,690,762, have been subject to injury of this type, which has been a serious defect in them, and which the present invention avoids. Usually valve 86, 88 will close in response to a pressure surge before piston 44 has even moved upwardly far enough to uncover or open the lowermost row of ports 41 so that no flow to the outlet 18 is permitted.

When the valve 86, 88 has thus been closed, the pressures on the opposite sides of piston 72 are equal, since there is no flow through orifice 73, and the only fluid force which tends to hold the needle against its seat 88 is a force equal to the small cross-sectional area of aperture 93 times the pressure in chamber 76, which pressure under these conditions is equal to the pressure in chambers 74 and 39. This force is counteracted by the force of spring 83 which acts in a direction tending to open the valve 86, 88, and the valve 86, 88 will then crack open, permitting fluid to be released slowly from chamber 39, so that the piston 44 can rise gradually. After the needle 86 has been lifted from its seat 88, piston 72 assumes control of the valve 86, 88 in accordance with the pressure drop across orifice 73 and thereafter controls the rate of release of fluid from chamber 39. Fluid is admitted to the outlet 18 slowly, first through ports 41, then through the next row of ports 42 to substantially equalize the pressures on the inlet and outlet sides of the valve before the main row of ports 43 is opened to permit full flow through the valve, so that portions of the hydraulic system on the outlet side of the valve are protected from the surge.

When the pressure at the inlet drops and spring 47 moves the piston downwardly in sleeve 33 toward closing position, chamber 39 fills with fluid which flows backwardly from outlet 18 upwardly through bore 19, through the seat member 89 and to the left through orifice 93, past valve 86, 88, which under these conditions is open, around retainer 78 and reversely through orifice 73 and downwardly through vertical bore 59 into chamber 39.

The postition at which needle 86 comes into closing contact with seat 88 may be adjusted by changing the axial position of seat member 89, in which the seat 88 is formed, by means of the adjusting screw 92. It will be apparent that the shorter the travel of piston 72 and retainer 78 required to close valve 86, 88, the more quickly the entire valve will respond to pressure increases to protect the hydraulic system in which it is mounted.

From the foregoing it will be seen that the present invention provides a relatively small control mechanism or cap structure which is adapted to be used with a wide variety of valve bodies without unduly enlarging the size of the valve. The cross bore 57 is of relatively small size, and it will be noted that the several elements are arranged in it in axially aligned, end-to-end arrangement, so that the overall cap structure is very compact.

While the invention has been described herein in relation to its preferred embodiment, it is not limited to that embodiment alone but also includes such variations and modifications as fall within the scope of the claims which follow.

What is claimed is:

1. A surge damping valve comprising, a body having a bore, an inlet entering said bore at one end thereof and an outlet extending laterally from said bore, means forming a plurality of axially spaced ports through which fluid can flow from said inlet to said outlet, the ports which are nearest to the inlet being small in size and permitting only restricted flow through them, the ports which are farthest from said inlet being large enough to permit unrestricted flow through them, a piston slidably fitted in said bore for closing and opening said ports, pressure at said inlet acting on and endwise portion of said piston and tending to move said piston in a direction opening said ports, a fluid retaining chamber being defined above said piston in said bore the pressure of fluid in which tends to prevent said piston from opening said ports, means resiliently biasing said piston toward said inlet, and control mechanism for controlling the rate at which said piston opens said ports in response to an increase in pressure at said inlet, said control mechanism being contained in a cap which is mounted to said body, said cap presenting a cross-bore, said cross-bore communicating between said chamber and said outlet, said control mechanism being contained in said cross-bore and comprising, means forming longitudinally spaced first and second stops in said cross-bore, a movable element in said cross-bore movable between said stops, a valve element in said cross-bore, a piston member in said cross-bore movable toward and away from said valve element, said piston member moving said movable element, orifice means through which fluid must flow to traverse said piston member, the pressure differential at opposite ends of said piston member created by the flow of fluid through said orifice means in response to movement of said piston in a direction tending to open said ports urging said piston member toward said valve element and urging said movable element toward said first stop, spring means urging said movable element toward said second stop and urging said piston member in a direction away from said valve element, movable valve means adapted to cooperate with said valve element to form a valve for controlling the flow of fluid through said cross-bore from said chamber to said outlet, said movable valve means being moved away from said valve element by said movable element when the latter is urged against said second stop by said spring means, and spring means between said piston member and said movable valve means resiliently closing the valve formed by said valve element and movable valve means when said movable element approaches and abuts said first stop.

2. A surge damping valve comprising, a body having a bore, an inlet entering said bore at one end thereof and an outlet extending laterally from said bore, a sleeve fitted in said bore, said sleeve being provided with a plurality of axially spaced ports through which fluid can flow from said inlet to said outlet, the ports which are nearest to the inlet being small in size and permitting only restricted flow through them, the ports farther from said inlet being large enough to permit unrestricted flow, a piston slidably fitted in said sleeve for closing and opening said ports, pressure at said inlet acting on an endwise portion of said piston and tending to move said piston in a direction opening said ports, a fluid retaining chamber being defined above said piston in said sleeve the pressure of fluid in which tends to prevent said piston from opening said ports, means resiliently biasing said piston toward said inlet, and control means for controlling the rate at which said piston opens said ports in response to an increase in pressure at said inlet, said control means being contained in a cap which is mounted to said body at the end of said bore which is opposite to said inlet, said control means comprising, a fluid passageway in said cap communicating between said chamber and said outlet, means forming a seat in said passageway, a valve element movable with respect to said seat and forming a valve with said seat for controlling the flow of fluid in said passageway from said chamber to said outlet, means resiliently urging said valve element away from said seat, pressure differentially operated means for moving said valve element into closing relation with said seat in response to a pressure increase in said chamber, said pressure differentially operated means being slidably received in said passageway between said chamber and said valve element and having a restricted orifice formed through it, and means forming a resilient abutting connection between said valve element and said pressure differentially operated means, whereby in response to sudden opening movement of said piston said pressure differentially operated means moves said valve element into resilient closing contact with said seat to restrict flow from said chamber to said outlet and thereby permits said piston to open said ports only gradually.

3. A surge damping valve comprising, a body having a bore, an inlet entering said bore at one end thereof and an outlet extending laterally from said bore, a sleeve fitted in said bore, said sleeve being provided with a plurality of axially spaced ports through which fluid can flow from said inlet to said outlet, the ports which are nearest to the inlet being small in size and permitting only restricted flow through them, the ports farther from said inlet being large enough to permit unrestricted flow, a piston slidably fitted in said sleeve for closing and opening said ports, pressure at said inlet acting on an endwise portion of said piston and tending to move said piston in a direction opening said ports, a fluid retaining chamber being defined above said piston in said sleeve the pressure of fluid in which tends to prevent said piston from opening said ports, means resiliently biasing said piston toward said inlet, and control means for controlling the rate at which said piston can open said ports in response to an increase in pressure at said inlet, said control means being contained in a cap which is mounted to said body at the end of said bore which is opposite to said inlet, said control means comprising, a fluid passageway in said cap communicating between said chamber and said outlet, means forming a seat in said passageway, a restricted aperture in said passageway between said seat and said outlet, a poppet having a valve member resiliently mounted at one end thereof, said poppet being movable with respect to said seat, said valve member forming a normally open valve with said seat for controlling the flow of fluid from said chamber to said outlet, means resiliently urging said poppet away from said seat, pressure differentially operated means for moving said poppet toward closing relation with said seat in response to a pressure increase in said chamber, said pressure differentially operated means being slidably received in said passageway between said chamber and said valve member and having a restricted orifice formed through it, whereby in response to sudden opening movement of said piston said pressure differentially operated means moves said valve member into resilient closing contact with said seat to restrict flow from said chamber to said outlet through said seat and thereby permits said piston to open said ports only gradually.

4. A surge damping valve comprising, a body having a bore, an inlet entering said bore at one end thereof and an outlet extending laterally from said bore, means forming a plurality of axially spaced ports through which fluid can flow from said inlet to said outlet, the ports which are nearest to the inlet being small in size and permitting only restricted flow through them, the ports which are farthest from said inlet being large enough to permit unrestricted flow through them, a piston slidably fitted in said bore for closing and opening said ports, pressure at said inlet acting on an endwise portion of said piston and tending to move said piston in a direction opening said ports, a fluid retaining chamber being defined above said piston in said bore the pressure of fluid in which tends to prevent said piston from opening said ports, means resiliently biasing said piston toward said inlet, and control means for controlling the rate at which said piston opens said ports in response to an increase in pressure at said inlet, said control means being contained in a cap which is mounted to said body, said control means comprising, a fluid passageway in said cap communicating between said chamber and said outlet, means forming a seat in said passageway, said seat having a restricted orifice through it, a needle valve member forming a needle valve with said seat for controlling the flow of fluid through said passageway from said chamber to said outlet, movable means in said passageway loosely mounting said valve member, a spring biasing said movable means away from said seat, a spring biasing said valve member toward said seat relative to said movable means, said needle valve normally being open, and pressure differentially operated means in said passageway between said movable means and said chamber for moving said movable means and valve member toward closing position with respect to said seat in response to an abrupt increase in pressure in said chamber.

5. A surge damping valve comprising, a body having a bore, an inlet entering said bore at one end thereof and an outlet extending laterally from said bore, a sleeve fitted in said bore, said sleeve being provided with a plurality of axially spaced ports through which fluid can flow from said inlet to said outlet, the ports which are nearest to the inlet being small in size and permitting only restricted flow through them, the ports farther from said inlet being large enough to permit unrestricted flow, a piston slidably fitted in said sleeve for closing and opening said ports, pressure at said inlet acting on an endwise portion of said piston and tending to move said piston in a direction opening said ports, a fluid retaining chamber being defined above said piston in said sleeve the pressure of fluid in which tends to prevent said piston from opening said ports, means resiliently biasing said piston toward said inlet, and control means for controlling the rate at which said piston opens said ports in response to an increase in pressure at said inlet, said control means being contained in a cap which is mounted to said body, said control means comprising, a fluid passageway in said cap communicating between said chamber and said outlet, means forming a seat in said passageway, said seat having a restricted orifice, a needle valve member forming a needle valve with said seat for controlling the flow of fluid through said passageway from said chamber to said outlet, movable means in said passageway resiliently mounting said valve member for movement relative to said seat, a spring biasing said movable means and valve member away from said seat whereby said needle valve is normally open, and pressure differentially operated means in said passageway between said movable means and said chamber for moving said movable means and valve member toward closing position with respect to said seat in response to movement of said piston in a direction displacing fluid from said chamber.

6. A surge damping valve comprising, a body having a bore, an inlet entering said bore coaxially at one end thereof and an outlet extending laterally from said bore, a sleeve fitted in said bore, said sleeve being provided with a plurality of axially spaced rows of ports through which fluid can flow from said inlet to said outlet, the ports of the row of ports which is nearest to the inlet being small in size and permitting only restricted flow through them, the ports of the row of ports which is farthest from said inlet being large enough to permit unrestricted flow through them, a cup-shaped piston slidably fitted in said sleeve for closing and opening said ports, pressure at said inlet acting on an endwise portion of said piston and tending to move said piston in a direction opening said ports, a fluid retaining chamber being defined above said piston in said sleeve the pressure of fluid in which tends to prevent said piston from opening said ports, a spring biasing said piston toward a closed position in which said piston closes all of said rows of ports, and control means for controlling the rate at which said piston opens said rows of ports in response to an increase in pressure at said inlet, said control means being contained in a cap which is mounted to said body at the end of said bore which is opposite to said inlet, said control means comprising, a fluid passageway in said cap communicating between said chamber and said outlet, means forming a seat in said passageway, said seat presenting a restricted orifice for flow through it, a needle valve member forming a needle valve with said seat for controlling the flow of fluid through said passageway from said chamber to said outlet, a movable valve member retainer in said passageway loosely mounting said valve member for movement relative to said seat, a spring biasing said retainer away from said seat whereby said needle valve is normally open, a pressure differentially operated piston member disposed in said passageway between said retainer and said chamber, said piston member having a restricted orifice through it between its opposite ends and being slidably received in said passageway for pushing said retainer toward said seat in response to movement of said piston in a direction displacing fluid from said chamber, and a spring biasing said valve member toward said seat with respect to said retainer.

7. A surge damping valve comprising, a body having a bore, an inlet entering said bore at one end thereof and an outlet extending laterally from said bore, a sleeve fitted in said bore, said sleeve being provided with a plurality of axially spaced ports through which fluid can flow from said inlet to said outlet, the ports which are nearest to the inlet being small in size and permitting only restricted flow through them, the ports farther from said inlet being large enough to permit unrestricted flow, a piston slidably fitted in said sleeve for closing and opening said ports, pressure at said inlet acting on an endwise portion of said piston and tending to move said piston in a direction opening said ports, a fluid retaining chamber being defined above said piston in said sleeve the pressure of fluid in which tends to prevent said piston from opening said ports, means resiliently biasing said piston toward said inlet, and control mechanism for controlling the rate at which said piston opens said ports in response to an increase in pressure at said inlet, said control mechanism being contained in a cap which is mounted to said body at the end of said bore which is opposite to said inlet, said cap presenting a cross-bore, said cross-bore communicating between said chamber and said outlet, said control mechanism comprising, means forming longitudinally spaced first and second stops in said cross-bore, a movable element in said cross-bore movable between said stops, a valve seat element in said cross-bore, said valve seat element presenting a restricted aperture formed through it, a piston member in said cross-bore movable toward and away from said valve seat element, said piston member abutting and moving said movable element, orifice means extending longitudinally through said piston member, the flow of fluid from said chamber through said orifice means to said outlet creating a pressure differential between the opposite ends of said piston member thereby urging said piston member toward said valve seat element and urging said movable element toward said first stop, first spring means urging said movable element toward said second stop and urging said piston member in a direction away from said valve seat element, movable needle valve means adapted to cooperate with said valve seat element to form a control valve for controlling the flow of fluid from said chamber to said outlet through said cross-bore, said movable needle valve means being moved away from said valve seat element by said movable element when the latter is urged against said second stop by said first spring means, and second spring means between said piston member and said movable needle valve means resiliently closing the valve formed by said valve seat element and movable needle valve means when said movable element approaches and abuts said first stop, said first spring means normally holding said movable element against said second stop against the force of said second spring means.

8. Control mechanism for use with surge damping valve structure of the type in which opening movement of a movable valve member in response to a pressure surge is resisted by the pressure of fluid in a fluid retaining chamber, said control mechanism being adapted to control the rate of release to an outlet of fluid in said chamber, said mechanism comprising, a cap mountable to said structure, a bore in said cap, first and second fluid passageways entering said bore at longitudinally spaced positions therealong, means forming a fixed seat in said bore between said passageways, fluid tending to flow into said bore through said first passageway in response to a surge in the valve structure with which the control mechanism is to be used and to said second passageway through said fixed seat, a valve element movable with respect to said seat and forming a valve with said seat for controlling the flow of fluid in said bore from said first passageway to said second passageway, means resiliently urging said valve element away from said seat, a piston slidable in said bore into abutting relation with said valve element for moving said valve element into closing relation with said seat, said piston being disposed between said first passageway and said seat, pressure surges thereby being applied to said piston without first being reflected through the valve seat, orifice means through which fluid must flow to traverse said piston, the pressure differential at opposite ends of said piston created by the flow of fluid through said orifice means urging said piston toward said valve element and thereby urging said valve element toward said seat, and means forming a resilient abutting connection between said piston and said valve element, whereby in response to the flow of fluid through said orifice means said piston moves said valve element into resilient closing contact with said seat to restrict the flow of fluid from said first passageway to said second passageway.

9. Control mechanism for a surge damping valve, said mechanism comprising, means forming a body, said body presenting a bore; means forming spaced first and second stops in said bore; a movable element in said bore movable between said stops; a fixed valve element in said bore; a first passage entering said bore on one side of fixed valve element and a second passage communicating with said bore on the opposite side of said valve element, the direction of fluid flow in response to a surge being from said first passage through said fixed valve element to said second passage, a piston between said first passage and said movable element in said bore, said piston being movable toward and away from said valve element, said piston moving said movable element; orifice means through which fluid must flow to traverse said piston, the pressure differential at opposite ends of said piston created by the flow of fluid through said orifice means urging said piston toward said valve element and urging said movable element toward said first stop; spring means urging said element toward said second stop and urging said piston in a direction away from said valve element; movable valve means adapted to cooperate with said valve element to form a valve for controlling the flow of fluid through said bore, said movable valve means being moved away from said valve element by said movable element when the latter is urged against said second stop by said spring means; and spring means between said piston and said movable valve means resiliently closing the valve formed by said valve element and movable valve means when said movable element approaches and abuts said first stop.

10. Control mechanism for a surge damping valve, said mechanism comprising, means forming a cap adapted to be mounted to said valve, said cap presenting a bore; means forming spaced first and second stops in said bore; a movable element in said bore movable between said stops; first and second passages entering said bore at opposite ends thereof, a valve seat element fixed in said bore, said valve seat element presenting a restricted fluid passageway through which fluid flows from said first passage to said second passage in response to a surge; a piston in said bore between said first passage and said movable element and movable toward and away from said valve seat element, said piston abutting and moving said movable element; orifice means extending longitudinally through said piston, the flow of fluid through said orifice means creating a pressure differential between the opposite ends of said piston, said pressure differential urging said piston toward said valve seat element and urging said movable element toward said first stop; first spring means urging said movable element toward said second stop and urging said piston in a direction away from said valve seat element; movable needle valve means adapted to cooperate with said valve seat element to form a valve for controlling the flow of fluid through said bore, said movable needle valve means being moved away from said valve seat element by said movable element when the latter is urged against said second stop by said first spring means; and second spring means between said piston and said movable needle valve means resiliently closing the valve formed by said valve seat element and movable needle valve means when said movable element approaches and abuts said first stop, said first spring means normally holding said movable element against said second stop against the force of said second spring means, said movable element, valve seat element, piston, and movable needle valve means being axially aligned in said bore in abutting end-to-end relation.

References Cited in the file of this patent
UNITED STATES PATENTS

| 1,962,549 | Bjorklund | June 12, 1934 |
| 2,311,110 | Johnson | Feb. 16, 1943 |
| 2,690,762 | Adams | Oct. 5, 1954 |